(12) United States Patent
Lo et al.

(10) Patent No.: US 10,498,162 B2
(45) Date of Patent: Dec. 3, 2019

(54) APPARATUS AND SYSTEM WITH ROTATABLE HOUSING FOR HARVESTING MAGNETIC ENERGY

(71) Applicant: MOTOROLA SOLUTIONS, INC, Chicago, IL (US)

(72) Inventors: Ya Yeing Lo, Yan (MY); Kow Chee Chong, Bayan Lepas (MY); Macwien Krishnamurthi, Shah Alam (MY); Swee Hak Law, Bukit Mertajam (MY); Sin Keng Lee, Bayan Lepas (MY); Sue Ling Tan, Malacca (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 186 days.

(21) Appl. No.: 15/661,051

(22) Filed: Jul. 27, 2017

(65) Prior Publication Data
US 2019/0036368 A1 Jan. 31, 2019

(51) Int. Cl.
*H02J 7/02* (2016.01)
*H02J 50/90* (2016.01)
*H02J 50/12* (2016.01)

(52) U.S. Cl.
CPC .............. *H02J 7/025* (2013.01); *H02J 50/12* (2016.02); *H02J 50/90* (2016.02)

(58) Field of Classification Search
CPC .. H02J 7/025; H02J 5/005; H02J 50/10; H02J 50/12; H02J 17/00
USPC .......................................... 320/108; 307/104
See application file for complete search history.

(56) References Cited

U.S. PATENT DOCUMENTS

| 2011/0309792 | A1  | 12/2011 | Mochida et al. |
|---|---|---|---|
| 2013/0119929 | A1  | 1/2013 | Abou-Kandil et al. |
| 2013/0043734 | A1* | 2/2013 | Stone ................... H04B 5/0037 307/104 |
| 2014/0117930 | A1* | 5/2014 | Imazu ................... B60L 11/182 320/108 |

(Continued)

FOREIGN PATENT DOCUMENTS

WO 2009033043 A2 3/2009

OTHER PUBLICATIONS

The International Search Report and the Written Opinion, corresponding patent application No. PCT/US2018/042678, filed Jul. 18, 2018, dated Oct. 9, 2018, all pages.

*Primary Examiner* — David V Henze-Gongola
(74) *Attorney, Agent, or Firm* — Barbara R. Doutre

(57) ABSTRACT

An apparatus, device, and charging system are provided. The apparatus comprises a primary stationary receive coil and a secondary rotatable receive coil, the primary stationary receive coil being electronically coupled to the secondary rotatable receive coil. The secondary rotatable receive coil provides a charge mode position when rotated in a same plane as the primary stationary receive coil. The secondary rotatable receive coil provides non-charge mode position when retracted back against the primary stationary receive coil. The coils may be coupled is series and or parallel configurations. The primary stationary receive coil may be integrated within or appended to a housing. The secondary rotatable receive coil may be integrated within or coupled to a rotatable clip coupled to the housing. Rotation of the clip extends a charging configuration with which to charge the primary stationary receive coil and the secondary rotatable receive coil.

18 Claims, 5 Drawing Sheets

(56) References Cited

U.S. PATENT DOCUMENTS

| | | |
|---|---|---|
| 2014/0253024 A1 | 9/2014 | Rautiainen et al. |
| 2014/0306654 A1 | 10/2014 | Partovi |
| 2015/0256021 A1* | 9/2015 | Kwon .................. H02J 5/005 320/108 |
| 2015/0280482 A1 | 10/2015 | Rosenfeld |
| 2016/0190853 A1* | 6/2016 | Yow ..................... H02J 7/025 320/108 |

* cited by examiner

US 10,498,162 B2

APPARATUS AND SYSTEM WITH ROTATABLE HOUSING FOR HARVESTING MAGNETIC ENERGY

FIELD OF THE DISCLOSURE

The present disclosure relates generally to wireless charging and more particularly wireless charging of portable devices with limited surface area.

BACKGROUND

Portable electronic devices need to be lightweight, power efficient and easy to charge. Wired or contact charging of such devices can be problematic due to tight space constraints. Contactless or wireless charging has become highly desirable as an alternative to wired charging. However, limited surface areas associated with many of today's smaller portable electronic devices make configuration of such devices for wireless charging extremely challenging. Additionally, the intelligence required by an overall charging system tends to be complex when a plurality of devices are in need of charging.

Accordingly, there is a need to for an improved approach to wireless charging of portable electronic devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
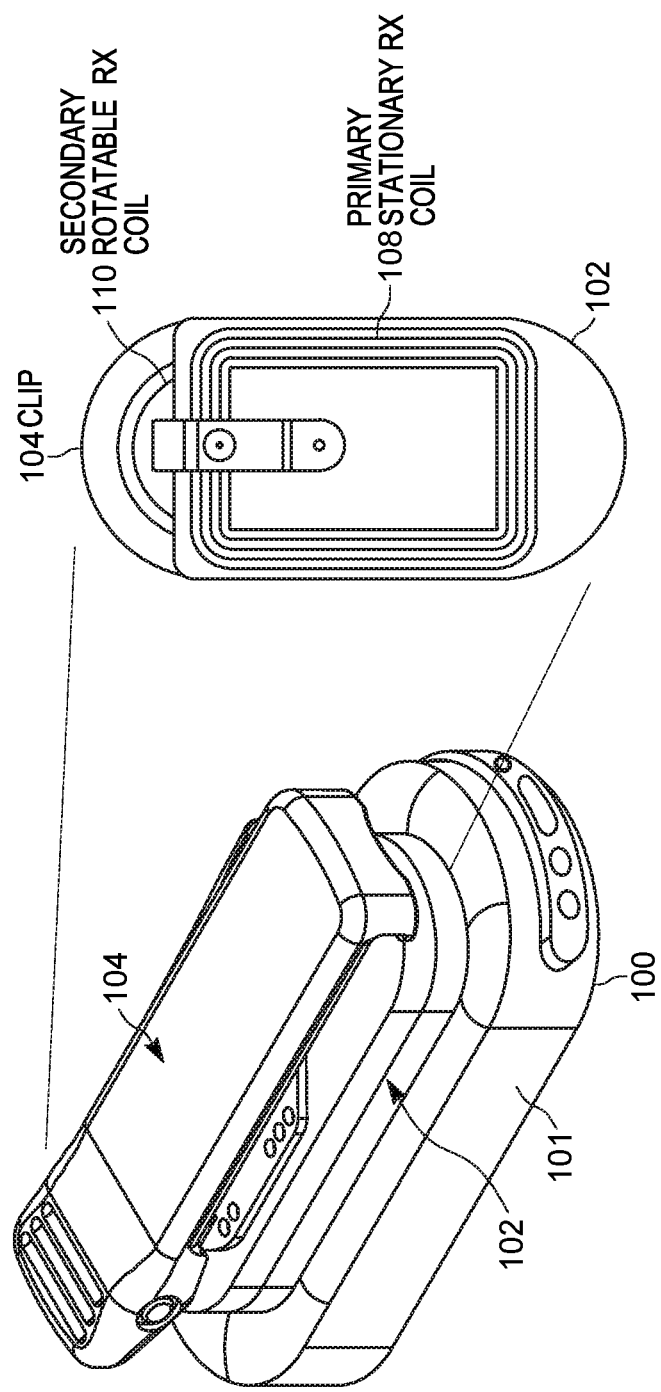
FIG. 1 is a portable electronic device incorporating a charging apparatus formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an apparatus that provides additional receive coils to a portable electronic device, and a charging system that efficiently charges one or more portable electronic devices via the additional receive coils. The apparatus is formed of a primary stationary receive coil located at the portable device housing and additional secondary receive coils rotatably coupled to the housing, via a clip or a plurality of rotatable blades. The additional rotatable coils are electronically coupled (in parallel or series) to the stationary primary receive coil. The coupled coils provide a larger coupling area with which to obtain higher efficiency and output power. The apparatus and system provide an orientation-independent configuration for charging the portable device on a charging mat having a single transmit coil.

FIG. 1 is a portable electronic device 100 incorporating a charging apparatus formed and operating in accordance with some embodiments. The portable electronic device 100 may comprise one of variety of wireless devices, such as a portable radio, remote speaker microphone (RSM), headset, wireless sensor, POD, and/or other wireless communication devices, wireless or modules. The portable electronic device 100 comprises a housing 101 having appropriate electronics, such as a processor and charging electronics. In accordance with some embodiments, a stationary receive coil 108 may be embedded within housing 101 or appended to housing 101. For the purposes of illustration, an appended housing portion 102 is shown coupled to device housing portion 101, wherein the appended housing portion 102 contains primary stationary receive coil 108. The primary stationary receive coil 108 may be coupled to or integrated within a substrate, such as a printed circuit board (not shown) within the appended housing 102.

In accordance with some embodiments, the por-table electronic device 100 further comprises a clip 104, the clip comprising a secondary receive coil integrated therein, thereby providing for a secondary rotatable receive coil 110. The secondary rotatable receive coil 110 may be coupled to or integrated within a substrate, such as a printed circuit board (not shown) within the clip 104. The clip 104 may be used to couple the portable electronic device 100 to a belt, pocket, and/or an epaulette when the device is in a normal operating mode. In accordance with some embodiments, the secondary rotatable receive coil 110 is coupled, in either a series or parallel configuration, to the primary stationary receive coil 108. In accordance with some embodiments, the clip 104 is a rotatable clip providing rotation of the secondary rotatable receive coil 110 from appended housing portion 102 for a charge mode of operation.

FIG. 1 shows the clip 104 in a retracted position in with the clip oriented to a zero-degree angle of rotation. This retracted position of clip 104 is the position used when the device 100 is held in a user's hand or is clipped to a belt, pocket, or an epaulette, during normal operating mode. In accordance with some embodiments, the clip 104 can be manually rotated to extend the secondary receive coil 110 to a position to harvest additional magnetic flux (energy) from an external transmit coil during a charge mode of operation.

The rotatable clip 104 provides for increased charging area when the clip is rotated, without increasing the size of the product when in regular use. The clip 104 provides a space effective approach that can also accommo-date, as will be shown in other embodiments, additional secondary rotatable receive coils via fanned blade-like extensions.

Figure 2:
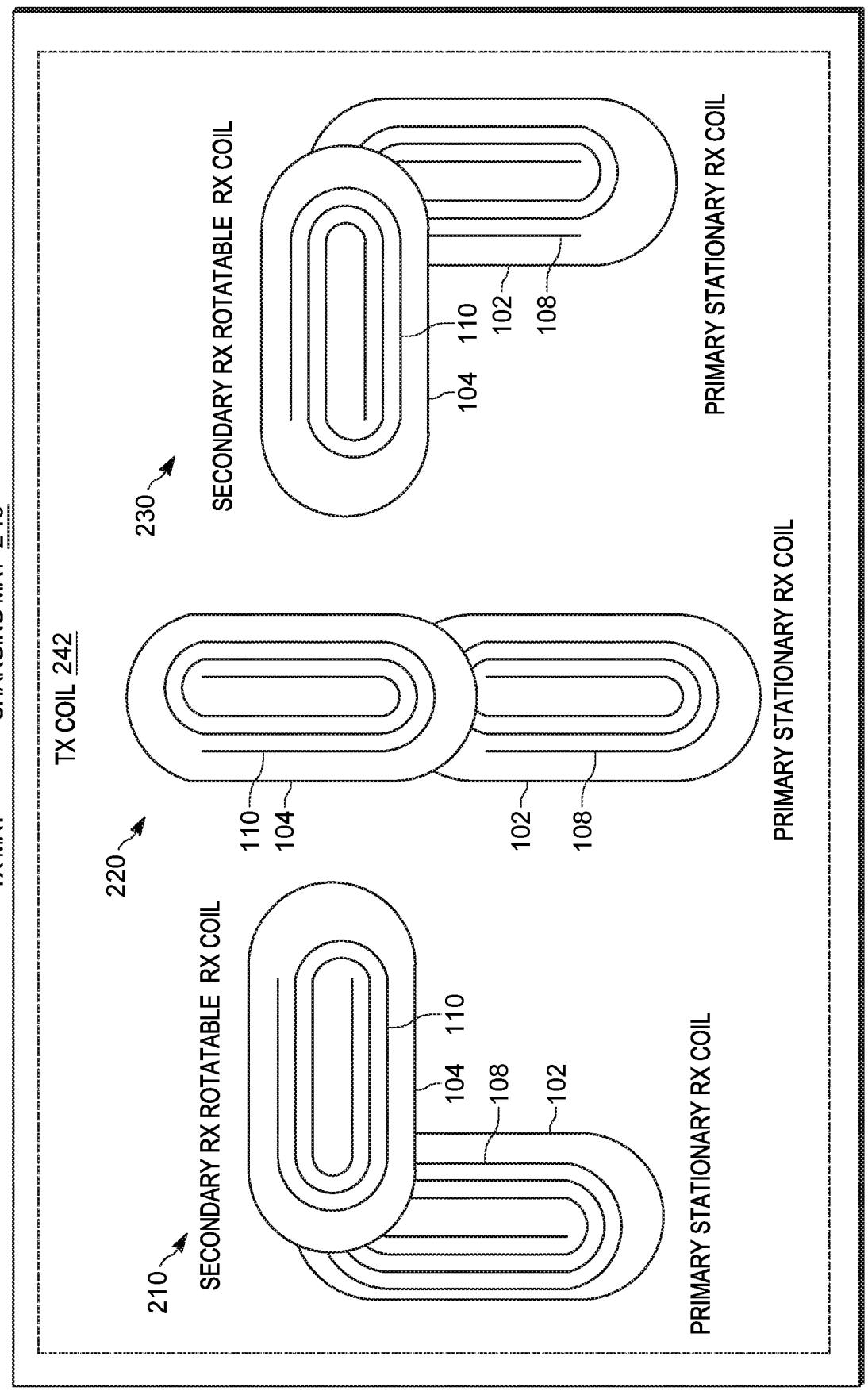
FIG. 2 shows a plurality of portable wireless devices being charged on a charge plate in accordance with some embodiments.

Referring now to FIG. 2, a plurality of portable wireless devices 210, 220, 230, are shown on a charging mat, or charge plate, 240 in a charge mode of operation in accordance with some embodiments. For the purposes of example, each device 210, 220, 230 has been shown with the dual coil configuration of the portable electronic device 100 of FIG. 1. Hence each device 210, 220, 230, comprises stationary primary receive coil 108 located within housing 102 and secondary rotatable receive coil 110 located within clip 104. Each device is shown with clip 104 rotated to a different degree of rotation for charging, allowing space on the charging mat 240 to be optimized.

Again, each secondary rotatable receive coil 110 of each device, 210, 220, 230 is coupled, in series or in parallel, with its' respective stationary primary receive coil 108 of each device. In accordance with some embodiments, the charging mat 240 comprises a single transmit coil 242 with which to charge the dual coil configuration of each device 210, 220, 230. In accordance with the embodiments, the additional receive coils have been rotated out to increase an area with which to capture magnetic flux and harness electrical energy from the single transmit coil 242.

In accordance with the embodiments, the secondary rotatable receive coil 110 is rotated in the same plane as the primary stationary receive coil 108 which is also in the same plane as the transmit coil 242. Device 210 shows dual coils 108, 110 being charged by single transmit coil 242 of the charging mat 240. The secondary rotatable receive coil 110 is shown rotated 90 degrees to the left relative to the stationary receive coil 108 (or depending on orientation, this could be viewed as a rotation direction of 270 degrees).

Device 220 shows dual coils 108, 110 being charged by single transmit coil 242 of the charging mat 240. The clip 104 containing secondary rotatable receive coil 110 is shown rotated 180 degrees relative to the primary receive coil 108.

Device 230 shows dual coils being charged by single transmit coil 242 of the charging mat 240. The clip 104 containing secondary rotatable receive coil 110 is shown rotated is shown rotated 90 degrees to the right of the stationary receive coil 108.

The wireless charging provided by single transmit coil 242 may also be referred to as inductive charging because it uses magnetic induction. For example magnetic resonance coupling may be implemented with operating frequency of 6.78 MHz, dependent upon tuning matching circuitry. Basically, magnetism is used to transmit energy from the larger single coil to the smaller dual coils. The charge plate or charge mat 240 includes charging circuitry which receives AC current from a wall power outlet which gets converted through appropriate circuitry to a DC current which is moved through the charge mat's transmitter which supplies power to the transmit coil 242, thereby creating a magnetic field, or flux with which to charge the stationary primary coil 108 and secondary coil 110 offset from each housing portion 102 of devices 210, 220, 230.

All of the orientations, as well as other possible degree offsets, provide improved coupling between secondary rotatable receive coil 110 and single transmit coil 242. Hence, a user wishing to charge one or more devices, such as devices 210, 220, 230 can manually rotate the device's clip 104 to extend the secondary receive coil 110 into a position that harvests additional magnetic flux (energy) from the transmit coil 242. As will be shown later, the wireless charging approach can be extended to additional secondary rotatable receive coils integrated within rotatable blades.

Figure 3:
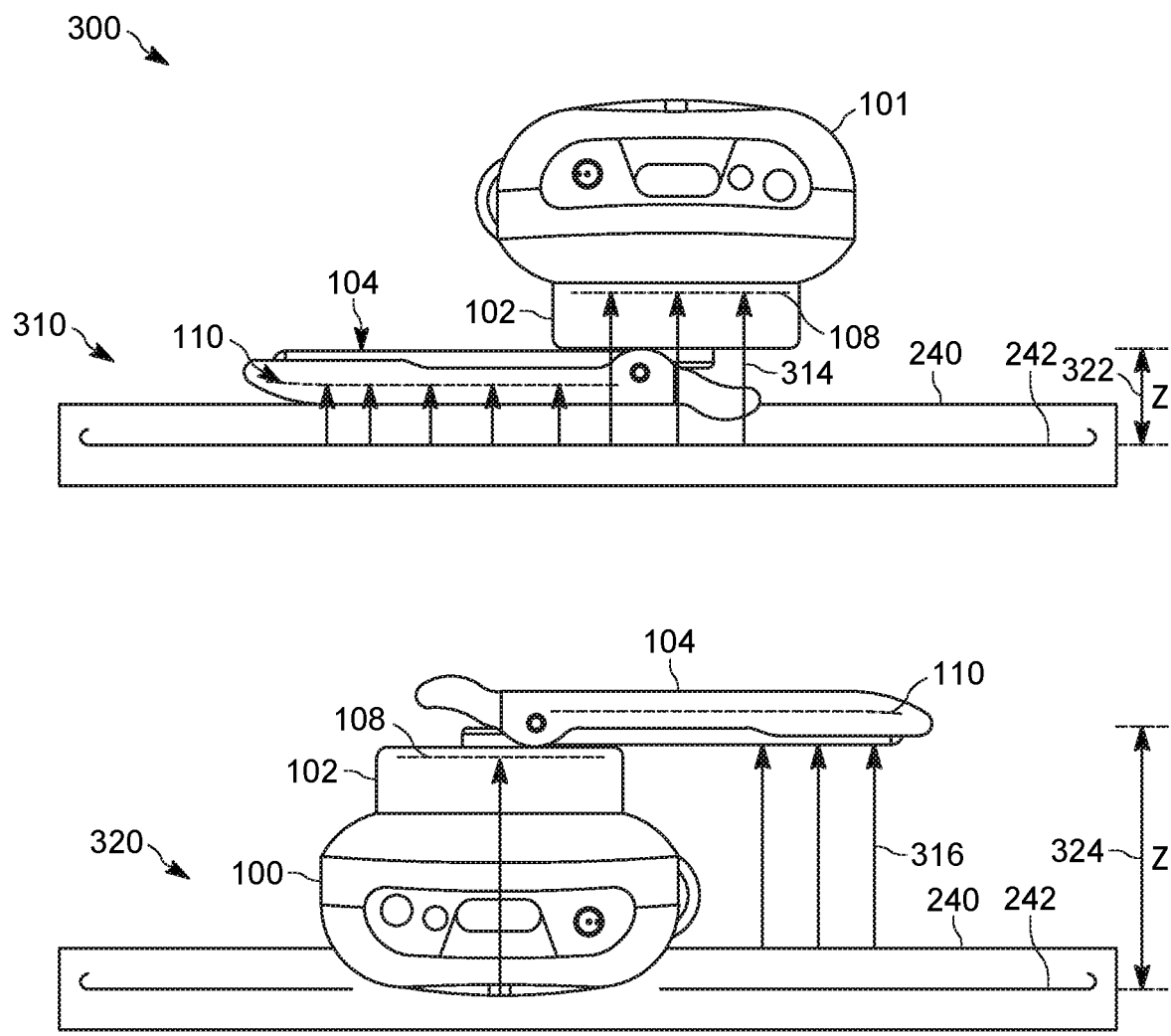
FIG. 3 shows the portable electronic device of FIG. 1 being charged in accordance with some embodiments.

FIG. 3 shows additional views 310, 320 of the portable device 100 being charged on charging mat 240 having a transmit charging coil 242 as part of a charging system 300 in accordance with some embodiments. Again, the portable device 100 comprises housing 102 containing primary stationary receive coil 108, and rotatable clip 104 having secondary receive coil 110 coupled thereto or inte-grated therein. The primary stationary receive coil 108 is electronically coupled, via series or parallel coupling, to the secondary rotatable receive coil 110. The use of dual (pri-mary stationary receive coil 108/secondary receive coil 110) or multiple secondary rotatable receive coils (described later), advantageously provides orientation-independent charging of portable device 100. View 310 shows the portable device 100 being charged in a face upward position, and view 320 shows the portable device being charged in a face downward position. In accordance with the embodi-ments, in either view 310 or 320, the secondary rotatable receive coil 110 is rotated in the same plane as the primary stationary receive coil 108 which is also in the same plane as the transmit coil 242.

System 300 beneficially utilizes loosely coupled magnetic resonance over a large charging area between the single transmit coil 242 and the secondary rotatable receive coil 110 of the clip 104, thereby negating any need for multiple transmit coils or tight z-displacement alignment. System 300 beneficially allows for one single transmit coil 242 to be used in charge mat 240, rather than individually powered and controlled transmit coils that would require intelligence to determine where the receiver happens to be located.

In view 310, the primary receive coil 108 is facing down towards the single transmit coil 242 of the charging mat 240, without being blocked by internal printed circuit boards or components. The clip 104 is rotated, along with its associ-ated coil 110, at 90-degrees. In this charging position, magnetic flux 314 couples from the transmit coil 242 through to the secondary rotatable receive coil 110, across z-displacement 322 and to the primary stationary receive coil 108.

In view 320, the primary receive coil 108 is facing up and the clip 104 is rotated at 90-degrees. Magnetic flux 316 transfers to the secondary coil 110 from the transmit coil 242 across z-displacement 324. The energy is then transferred from the secondary coil 110 to the coupled primary station-ary coil 108. In this view, even if some internal circuit boards and components of the device potentially block some of the magnetic flux 316 from directly passing to the first receive coil 108, the flux 316 captured by the secondary coil 110 is sufficient to charge the device 100.

As an example, measured results were taken on dual Rx coils shown in the following Table:

| Measurement | Input power to TX | | Rx output power | | Displace-ment Z-distance Tx coil to Rx coil (cm) | Eff (%) |
|---|---|---|---|---|---|---|
| Coil each 23 × 37 mm | Voltage (V) | Current (A) | Voltage (V) | Current (A) | | |
| Single (one coil) | 36 | 0.37 | 4.56 | 0.522 | 1 | 17.9 |
| Parallel (dual coils) | 36 | 0.27 | 4.9 | 0.522 | 4 | 26.3 |
| Series (dual coils) | 36 | 0.3 | 4.9 | 0.522 | 4 | 23.7 |
| Parallel (dual coils) | 36 | 0.34 | 4.9 | 1.03 | 2 | 41.2 |
| Series (dual coils) | 36 | 0.38 | 4.3 | 1.03 | 2 | 32.4 |

The measured results indicate that the dual receive coils (connected in parallel or series) obtained a significantly better efficiency and were able to obtain a higher output power than a single receive coil. The dual receive coil was able to achieve a 0.5 A receive power output at a larger Z-distance as well as better efficiency than a single coil. The dual receive coil was able to achieve a 1 A receive power output current with even greater Z-distance.

In accordance with some embodiments, additional receive blades can be added to the apparatus. The number of receive "blades" can be used to significantly increase the electrical power. For example, according to theoretical analysis a formation of six similar blades, could harness 5 Vdc@3 A of power.

Hence, the use of dual (stationary primary coil and rotatable secondary receive coil in blade or belt clip) or multiple receive coils (stationary primary coil and a plurality of secondary rotatable receive coils in multiple blades) provides improved efficiency and output power. The use of magnetic-resonance coupling to the charger source via loose-coupling through z-displacement.

Figure 4:
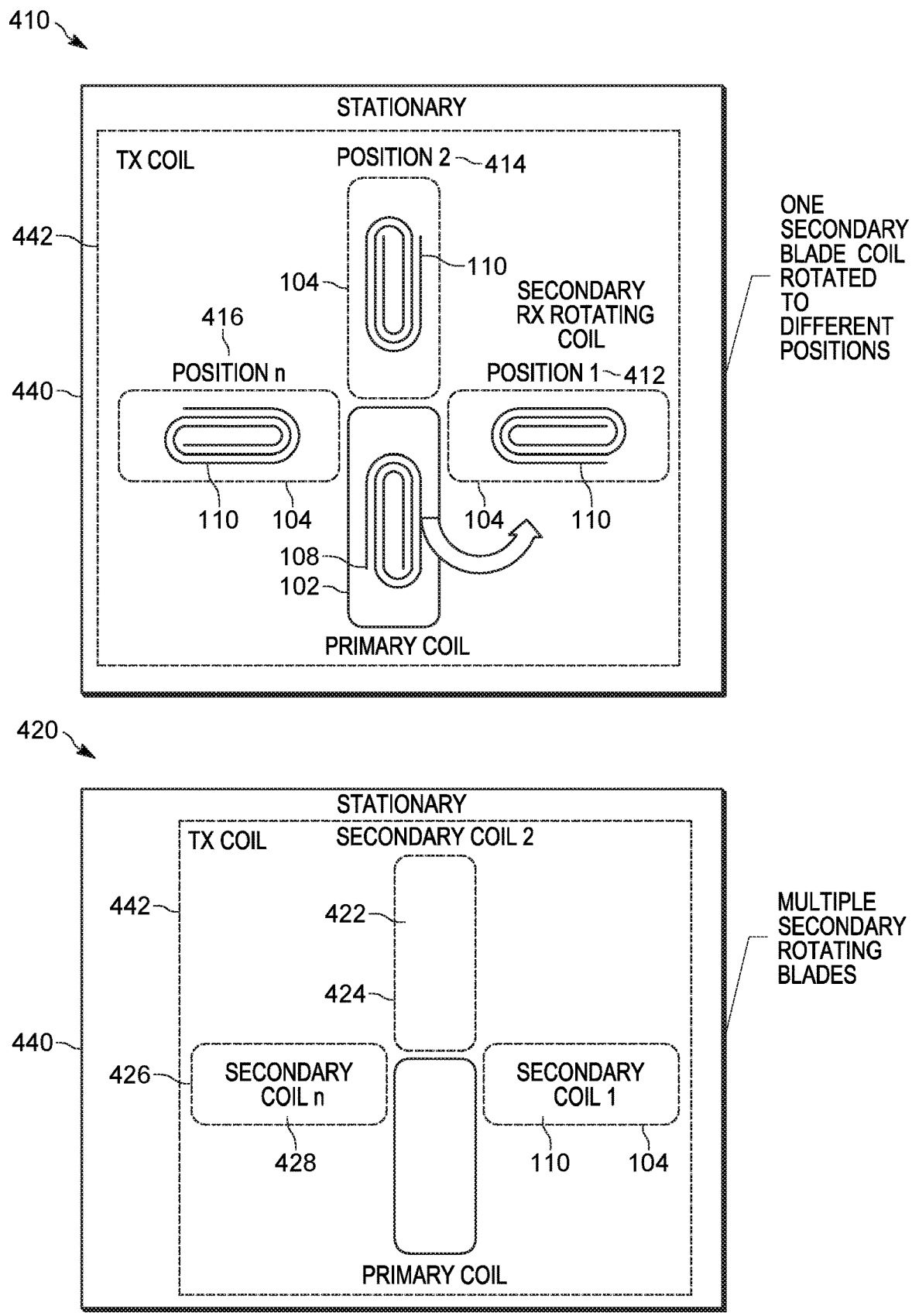
FIG. 4 shows a secondary receive coil rotated through various blade positions and shows a plurality of secondary receive coils rotated to different positions in accordance with some embodiments.

FIG. 4 shows a secondary receive coil rotated through various blade positions and shows a plurality of secondary receive coils rotated to different positions in accordance with some embodiments. View 410 shows a single rotating blade 104 having coil 110 embedded therein rotated through a plurality of positions in accordance with some embodiments. View 420 shows a plurality of blades, each containing its own secondary rotatable receive coil, being rotated to various positions in accordance with some embodiments. Again, in either view the primary stationary coil 108 is either embedded within a housing or appended to a housing. In accordance with the embodiments, in either view 410, 420, the secondary rotatable receive coil 110 is rotated in the same plane as the primary stationary receive coil 108 which is also in the same plane as the transmit coil 242.

Referring first to view 410, the blade 104 having receive coil 110 embedded therein is rotated through a plurality of offset positions, shown here as first position 412, second position 414, through 'n' positions 416. The first and last rotated positions 412, 416 provide 90 degree offsets relative to the primary stationary receive coil (rotated position 416 representing 270 degrees of rotation from primary stationary receive coil 108). The second position 414 provides a 180 degree offset of the secondary coil 110 relative to the primary coil 108. Different degrees of offset can also be used. Hence, the secondary rotatable receive coil can advantageously rotate amongst a plurality of adjustable rotation positions for a charge mode. The primary stationary coil and secondary rotatable receive coil couple via the transfer of magnetic flux from transmit charging coil 442 embedded within a charging mat 440.

Referring now to view 420, this view shows a plurality of blades 104, 424, 426, each containing its own secondary receive coil thereby respectively providing rotatable receive coil 110, rotatable receive coil 422 and rotatable receive coil 428. Again, the primary stationary coil 108 may be either embedded within a housing, such as the device housing 101 of FIG. 1, or may be appended to a housing, such as appended housing 102 of FIG. 1.

In view 420, blade 104 containing receive coil 110 is rotated to a first position offset by 90 degrees relative to the primary stationary coil 108. The second blade 424 containing secondary rotatable receive coil 422 is rotated to a position offset by 180 degrees relative to the primary stationary coil 108. A last blade, shown as blade "n" 426 contains another secondary rotatable receive coil 428 rotated to a position offset to the primary stationary coil 108 by 90 degrees (via rotation of 270 degrees or possibly rotation in an opposite direction from the other blades). Additional blades with additional secondary rotatable receive coils may be rotated to offset from the primary stationary receive coil 108 at different angles of rotation. Accordingly, the secondary rotatable receive coils can advantageously rotated amongst a plurality of adjustable rotation positions for a charge mode. All of the secondary rotatable receive coils are thus able to couple via the transfer of magnetic flux from transmit charging coil 442 embedded within charging mat 440.

The dual (view 410) or multiple (view 420) secondary rotatable receive coils achieve improved efficiency and output power by using magnetic-resonance coupling to the charger source. The improvement in efficiency and output power can be achieved with loose-coupling through z-displacement as opposed to far more complex tight coupling. The interconnection between the coils of each blade is achieved through wires and hinge contacts. The rotation of the secondary coil can be rotated clockwise and counter-clockwise. The coils may be rotatable within a predetermined range of rotation. Over-rotation is prevented mechanically which avoid the wires from being over-stretched or damaged.

Figure 5:
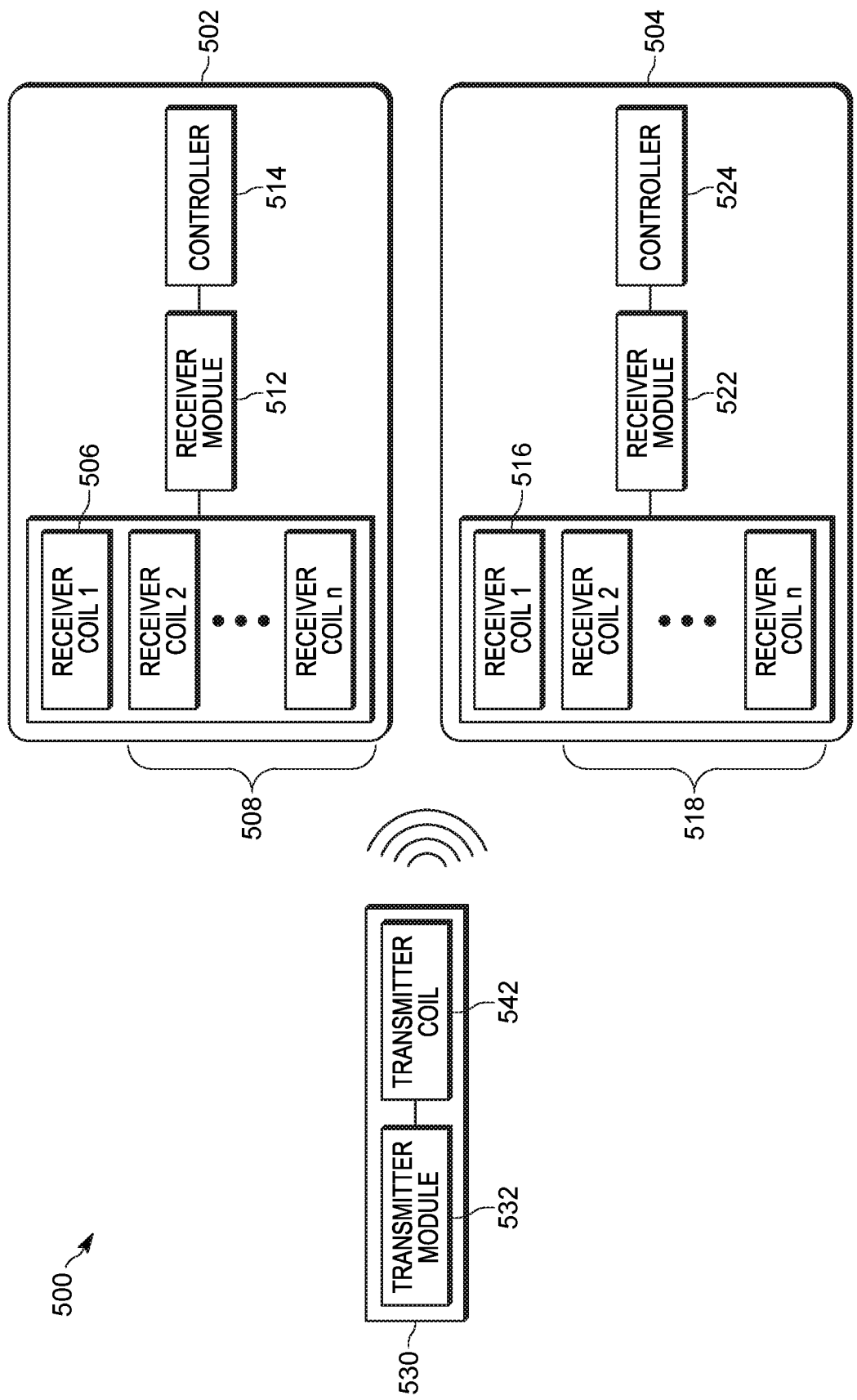
FIG. 5 is a block diagram of a charging system in accordance with some embodiments.

FIG. 5 is block diagram of a charging system 500 formed and operating in accordance with some embodiments. Charging system 500 comprises a charging surface 530, such as a charging mat or plate comprising a transmitter module 532 which may comprise known charging circuitry such as AC-DC converter, frequency source, RF power amplifier, output matching circuitry, controller and communication link, known in the art. The charging surface 530 further comprises a single transmitter coil 542 with which to charge one or more devices 502, 504 located on surface 530. The one or more devices 502, 504 may comprise for example, one or more portable communication devices and/or other portable wireless electronic devices.

As from the previous embodiments, each device contains a primary receive coil which is stationary and at least one additional secondary receive coil is rotatable. The receive coils may be configured in either parallel or series configurations. In this embodiment, device 502 comprises a primary stationary receive coil (1) 506 which may coupled in a series configuration with secondary rotatable receive coils (2 through secondary rotatable receive coil "n") 508. The second device 504 comprises its' own respective pri-mary stationary receive coil (1) 516 coupled in a parallel configuration with secondary rotatable receive coils (2 through secondary rotatable receive coil "n") 518. Each secondary rotatable receive coil 2-"n" associated with each device 502, 504 is rotatable via separate rotational blades to provide an offset relative to its associated primary stationary coil 506, 516 in the manner previously described. Both devices 502, 504 can be placed on the charging mat 530 with blades rotated so as to offset the receive coils of each device from primary stationary receive coil. Hence, all coils of the two devices 502, 504 can be charged via the wireless energy transfer from single transmit coil 542. The charging system accommodates dual and multiple receive coils as previously described. Both series and parallel circuits may be achieved, if desired, on one device with multiple coils and appropriate matching. In accordance with the embodiments, each secondary rotatable receive coil(s) of device 502 and 504 are rotatable in the same plane as their respective primary stationary receive coil(s) which is also in the same plane as the transmit coil 542.

Device 502 may comprise a receiver module 512, which may comprise receiver circuitry such as a rectifier and DC/DC converter and other charging component related to charging the device 502. Device 502 may further comprise a controller 514, providing a microprocessor, memory and appropriate charging algorithms for charging device 502. Device 504 may comprise a receiver module 522, which may comprise circuitry such as a rectifier and DC/DC converter and other charging components for charging the second device 504. Device 504 may further comprise a controller 524, providing a microprocessor, memory and appropriate charging algorithms for charging device 504. The receiver coils, receiver modules and controllers perform the power conversion of the harvested received magnetic flux from the transmit coil 542 of the charging mat 530. The system thereby advantageously harnesses wireless charging electrical energy via magnetic resonance between the transmitter coil 542 and the respective receiver coils 506, 516 of the first device 502, and the second device 504 respectively in a similar manner.

The use of a clip or blades to house additional coils for improved coupling beneficially provides an apparatus particularly advantageous for portable devices having small surface areas needing to be charged. The additional coils can be rotated out to increase the harvesting area without taking up additional space when the product is in a non-charging mode.

Portable two way radios and wireless accessories such as remote speaker microphones, headsets, and sensors are just a few examples of body-worn, wireless electronic devices that can take advantage of the clip configuration. The clip of each device 502, 504 may be coupled to a belt, pocket, and/or epaulette when the devices 502, 504 are in a normal operation mode, and a clip, as previously described containing secondary rotatable blades with respective secondary rotatable coils 508 and 518, may be rotated out with blades fanned out for a charge mode of operation. The charging system, device, and apparatus are particularly beneficial to public safety environments including, but not limited to, devices used in law enforcement, fire rescue, and other emergency services.

Accordingly, there has been provided an apparatus, device, and charging system that advantageously avoids having to concentrate the use of magnetic fields at a center region of the source pad and further negates the need for multiple TX coils or intelligent sensing to activate appropriate coils. No complicated sensing electronics are needed as the magnetic flux coupling occurs during a charge mode in which one or more blades having the secondary rotatable receive coils is rotated or extended away from the main housing of the device or main housing of the belt clip.

The rotating clip connecting dual Rx coils obtains larger coupling area and higher efficiency and output power, and also provides orientation-independent charging without complicated sensing electronics. The added number of Rx blades (each with one coil) can significantly increase the electrical power. The harvesting apparatus can be used on many different types of portable products and wireless charging modules, such as a wireless remote speaker microphone, a POD, a sensor module, a pager, to name a few. Depending on power requirements, known or yet to be developed, a portable radio, could also benefit from the belt clip described by the various embodiments. The approach provided by the various embodiments is readily detectable by a visual inspection of product interior or disassembled parts.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. An apparatus comprising:
a primary stationary receive coil located in a housing, the housing having a rotatable clip coupled thereto;

a secondary rotatable receive coil located in the rotatable clip, the primary stationary receive coil being electrically coupled to the secondary rotatable receive coil without sensing electronics coupled therebetween;

the secondary rotatable receive coil providing a charge mode position when rotated in a same plane as the primary stationary receive coil, and the secondary rotatable receive coil providing a non-charge mode position when retracted back against the primary stationary receive coil; and a plurality of rotatable blades coupled to the rotatable clip, each rotatable blade providing an additional secondary rotatable receive coil arranged in series and/or parallel configuration with the primary stationary receive coil.

2. The apparatus of claim 1, wherein the secondary rotatable receive coil rotates amongst a plurality of adjustable rotation positions for a charge mode.

3. The apparatus of claim 2, wherein the primary stationary receive coil and the secondary rotatable receive coil are electrically coupled by at least one of:

series coupling; and
parallel coupling.

4. The apparatus of claim 1, wherein the primary stationary receive coil and the secondary rotatable receive coil harvest electrical energy via magnetic resonance from a single external transmit coil.

5. A portable electronic device, comprising:

a housing comprising electronics and a primary stationary receive coil coupled thereto; and at least one rotatable blade comprising a secondary receive coil integrated therein, the secondary receive coil being electrically coupled to the primary stationary receive coil without sensing electronics coupled therebetween, and each of the at least one rotatable blade comprising the secondary receive coil being rotatable in a same plane as the primary stationary receive coil; and additional rotatable blades coupled to the housing, each of the additional rotatable blades comprising an additional receive coil arranged in a series and/or parallel with the primary stationary receive coil.

6. The portable electronic device of claim 5, wherein the primary stationary receive coil is integrated within the housing of the portable electronic device.

7. The portable electronic device of claim 5, wherein the primary stationary receive coil is appended to the housing of the portable electronic device.

8. The portable electronic device of claim 5, wherein the at least one rotatable blade is formed as a rotatable clip, the rotatable clip providing rotational offset of the secondary receive coil relative to the primary stationary receive coil of the housing.

9. The portable electronic device of claim 5, wherein the at least one rotatable blade is formed as a rotatable clip, the rotatable clip providing orientation-independent charging of the portable electronic device.

10. The portable electronic device of claim 5, wherein each of the additional receive coils of the additional rotatable blades harnesses wireless charging electrical energy via magnetic resonance.

11. The portable electronic device of claim 5, wherein portable electronic device comprises one of: a wireless remote speaker microphone (RSM), a pager, a POD, a sensor module, a portable radio.

12. A charging system, comprising:

a portable communication device comprising a housing, the housing having a primary stationary receive coil coupled thereto;

a plurality of rotatable blades coupled to the housing;

a secondary receive coil coupled within each of the rotatable blades thereby providing a plurality of secondary rotatable receive coils, the plurality of secondary rotatable receive coils being electrically coupled to the primary stationary receive coil without sensing electronics coupled therebetween; and a charging mat having a single transmit coil for charging the portable communication device via the primary stationary receive coil and the plurality of secondary rotatable receive coils when the plurality of secondary rotatable receive coils are rotated from the housing.

13. The charging system of claim 12, wherein the primary stationary receive coil and the secondary rotatable receive coil are electrically coupled in parallel.

14. The charging system of claim 12, wherein a primary stationary receive coil and the secondary rotatable receive coil are electrically coupled in series.

15. The charging system of claim 12, wherein charging of the portable communication device is independent of orientation of the housing on the charging mat.

16. The charging system of claim 12, wherein the rotatable blade is a belt clip having the secondary receive coil embedded therein.

17. The charging system of claim 12, wherein the plurality of blades having embedded receive coils form series and/or parallel configurations with the primary stationary receive coil.

18. The charging system of claim 12, wherein the plurality of secondary rotatable receive coils harness electrical energy via magnetic flux from the single transmit coil of the charging mat during a charge mode in which the plurality of rotatable blades are each rotated to individual offset positions relative to the primary stationary receive coil of the housing.

* * * * *